US005623963A

United States Patent [19]
Stommes et al.

[11] Patent Number: 5,623,963
[45] Date of Patent: Apr. 29, 1997

[54] MODULAR VALVE POSITION INDICATOR

[75] Inventors: Wallace F. Stommes, Fergus Falls; Ross S. Kunz, Callaway; Bryan A. Beckman, Wendell; Christopher J. Kunz, Callaway, all of Minn.

[73] Assignee: StoneL Corporation, Fergus Falls, Minn.

[21] Appl. No.: 529,693

[22] Filed: Sep. 18, 1995

[51] Int. Cl.$^6$ .............................. E03B 7/07; F16K 37/00
[52] U.S. Cl. .......................................... 137/554; 137/556
[58] Field of Search ................................. 137/552, 553, 137/554, 556

[56] References Cited

U.S. PATENT DOCUMENTS

| | | | |
|---|---|---|---|
| 3,238,968 | 3/1966 | Pecis | 137/556 |
| 4,194,529 | 3/1980 | Hargraves et al. | 137/557 |
| 4,327,768 | 5/1982 | Behle | 137/553 |
| 4,494,565 | 1/1985 | Sinclair et al. | 137/555 |
| 4,494,566 | 1/1985 | Sinclair et al. | 137/556 |
| 5,137,052 | 8/1992 | Baumgart | 137/556 |
| 5,178,187 | 1/1993 | Raymond, Jr. et al. | 137/556 |
| 5,223,822 | 6/1993 | Stommes et al. | 340/686 |
| 5,224,512 | 7/1993 | Nogami et al. | 137/553 X |
| 5,277,223 | 1/1994 | Glockner et al. | 137/554 |
| 5,305,781 | 4/1994 | Raymond et al. | 137/554 |

FOREIGN PATENT DOCUMENTS

| | | | |
|---|---|---|---|
| 0584975 | 2/1994 | European Pat. Off. | 137/556 |

OTHER PUBLICATIONS

Bray International, Inc. brochure on 2N1 Proxsensor Valve Status Monitor (Jun. 1995).
Keystone Controls brochure on a K–Block Fixed Style Magnetic Activator to Figure 790–100/200/300 Activators (1995).
Keystone Controls brochure on a K–Block Adjustable Magnetic Activator to Figure 790–400/500 Actuators (no date).
Induktiv Kosten Sinken Doppelsensor Ind. brochure. (no date).
Efector Inc's brochure on a Model Ind proximity switch (no date).
Efector Inc's spec sheet for the Inductive Proximity Switch (no date).
VDI/VDE 3845–*Handbuch Regelungstechnik*, "Stellgerate fur stromende Stoffe", 1989, pp. 1–5.
Charles M. Simchera, *Part–Turn Valve & Actuator Standardization*, 1995, pp. 14–24.

*Primary Examiner*—Hoang Nguyen
*Attorney, Agent, or Firm*—Haugen and Nikolai, P.A.

[57] ABSTRACT

A modular valve position indicator which interfaces with a valve, actuator and other auxiliary equipment meeting NAMUR standards is described. The position of the valve within the flow circuit is indicated by at least one of an LED display and color coded indicia. A drum having the color coded indicia thereon, rotates through a window defined by members of the indicator in response to the rotation of the valve.

8 Claims, 4 Drawing Sheets

MODULAR VALVE POSITION INDICATOR

BACKGROUND OF THE INVENTION

I. Field of the Invention

This invention relates generally to flow circuit valve position indicators, and more particularly to a modular valve position indicator compatible with international standards, and interfaces with a valve, actuator and other auxiliary equipment. A drum having color coded indicia thereon, rotates through a window defined by other members of the modular indicator in response to the rotation of the valve.

II. Discussion of the Related Art

Operating personnel in many industrial and laboratory settings must know, at a glance, whether a fluid-flow control valve is in an open (fluid passing) or closed (fluid blocking) disposition. A commercially available position indicator, a product of Keystone Controls, Inc., of Houston, Tex. provides an indicator that is associated with the valve actuator by a magnetic lobe. The valve position is indicated by green and red LED's. The position indicator comprises one housing and a drum associated with the housing. Many devices have been devised for providing such an indication. In this regard, reference is made to U.S. Pat. Nos. 4,494,565; 4,494,566; 5,277,223; 4,194,529; 5,178,187; and applicant's earlier U.S. Pat. Nos. 4,962,290 and 5,273,822. Of the above related patents, only the '290, '223 and '822 patents provide an electrical signal along with the visual indication to advise personnel of the operational state of a valve to which the valve position indicator is attached.

Glockner et al. in U.S. Pat. No. 5,277,223 describes a valve position transmitter which provides both visual and electrical outputs indicative of valve position. The '223 indicator is comprised of a base, an adjusting ring, an indicator assembly, a transparent cover, switches, and cams for detecting rotation. The switches are actuated by a camming system, which are positionaly mounted on sliding splines. The position of the camming system must be adjusted, to effectively actuate the switch. This adjustment increases the amount of set-up time and further increases the complexity of the valve position indicator. Therefore, a need exist for a simple and economical valve position indicator which provides both visual and electrical outputs indicative of valve position. Also, a need exists for a valve position indicator that requires fewer elements, while indicating both visually and through an electrical output, the position of the valve.

It is also apparent from an examination of the above prior art patents that the means for attaching the indicator to the valve body varies considerably and does not follow any particular interface standard. For example, J. G. Pecis, in U.S. Pat. No. 3,238,968, shows an indicator attached to the valve body using one bolt. Sinclair et al., in both the above-mentioned '565 and '566 patents, shows a mounting ring portion of the indicator having three orifices for securing the indicator to the valve body. Raymond Jr., et al., in U.S. Pat. No. 5,178,187 shows a mounting pedestal having four bores symetrically positioned defining a square. The significance of the location of the bores is not at all clear from the disclosure.

In 1991, the Society of German Engineers and the Association of German Electrotechnicians, following the recommendations of the Standards Working Group for Instrumentation and Controls (NAMUR), promulgated a standard "VDI/VDE 3845" which defines the interfaces between rotary actuators, the fluid control valve bodies, and other accessories. VDI/VDE 3845 standardizes the height of the top mounted accessory, the position of the mounting bores, and the slot formed in the top of the actuator shaft. Thus, it is now advantageous, if not necessary for commercial marketing reasons, that valve position indicators meet these applicable international standards.

While the above prior art devices, could conceivably be jury-rigged to mate with the screw hole pattern defined by the NAMUR standard, it would be advantageous to have a valve position indicator especially designed to meet this standard so that no special adapters, mounting brackets, etc. would be required.

The present invention overcomes these and other disadvantages by providing an efficient to use and economical valve position indicator conforming with NAMUR standards. The valve position indicator provides both visual and electrical outputs indicative of valve position.

SUMMARY OF THE INVENTION

The purpose of the present invention is to provide an economical, simple, modular valve position indicator which indicates, both visually and through electrical output, the position of the valve. The valve position indicator may also act as a termination enclosure for auxiliary components such as a solenoid valve. The valve position indicator consists of a drum, first and second housing members, sensors, and LED's, wherein the first and second housing members can be positioned circumferentially about the drum to provide a window for visual indication. The overall height of the drum and housing members are within the NAMUR standards, and may alternatively be less than the NAMUR standard to thereby allow a second accessory to be mounted above the drum and housing if desired.

The valve position indicator components are attached to a valve's actuator shaft and to the valve body. More particularly, the drum is mounted to the actuator shaft and rotates simultaneously with the actuator shaft. The drum and actuator shaft rotate between a first position when a valve contained within the valve body is in a fluid blocking condition and a second position when the valve is in a fully open, fluid passing condition.

The first and second housing members are mounted on the valve body diametrically opposite each other relative to the drum. The first and second housing members have mounting bores through which screws can pass for attachment to the valve body, the spacing between the mounting bores conforming to NAMUR standards. When the drum is positioned between the first and second housing members, an external cylindrical surface of the drum is partially surrounded by the first and second housing members, leaving a first and second window for viewing the drum.

The drum is color coded and partitioned into four quadrants. th first and third quadrants are colored the same likewise the second and fourth quadrants are colored the same. When the drum is rotatably positioned between the housing members, either the first and third quadrants or the second and fourth quadrants are simultaneously viewable through the first and second windows defined by two housing members. The coloring of the drum indicates to a viewer the position if the value within the valve body. Also, if desired, alphanumeric information can be printed on the drum as well.

In an alternate preferred embodiment, either the first or second housing may have a cavity formed therein for containing electronic circuitry used to provide an indication of valve position to a remote site. First and second proximity sensors are positioned on a surface of one of the housing members that partially surrounds the drum. Each sensor cooperates with a target member mounted on the drum. The sensors are linked to a circuit assembly, a pair of LED indicators, and a power source rough a terminal junction strip. Electrically conductive wires connecting the power supply to the terminal junction strip extend through one of several conduits formed in the side of the housing. When a target moves into proximity to a corresponding sensor, a corresponding LED indicator is illuminated.

The target members are positioned on the drums such that when the drum is rotated to a first fluid blocking position the first sensor is actuated, thereby causing the first LED to be illuminated. When the drum is rotated to a second fluid passing condition, the second sensor is actuated, thereby causing the second LED to be illuminated. The target members may be permanently affixed on the drum or be adjustably affixed to the drum by known means. The sensors may also be operatively coupled to a microprocessor-based controller, whereby the drums position may be monitored by the microprocessor and used to transmit valve position data to a remote site.

It is accordingly a principle object of the present invention to provide a valve position indicator that indicates the position of a valve within a fluid flow circuit, both visually and electrically.

Another object of the present invention is to provide a valve position indicator that satisfies NAMUR standards.

Yet another object of the present. invention is to provide a simple, economical, valve position indicator.

Still another object of the present invention is to provide a simple, economic, and adjustable visual indicator.

A further object of the present invention is to provide a wiring termination enclosure for terminating auxiliary equipment including solenoid valves and the like.

The foregoing objects, and advantages of the present invention will be readily apparent to those skilled in the art from a review of the following detailed description of the preferred embodiment especially when considered in conjunction with the accompanying drawings.

DETAILED DESCRIPTION OF THE PREFERRED EMBODIMENT

Figure 1:
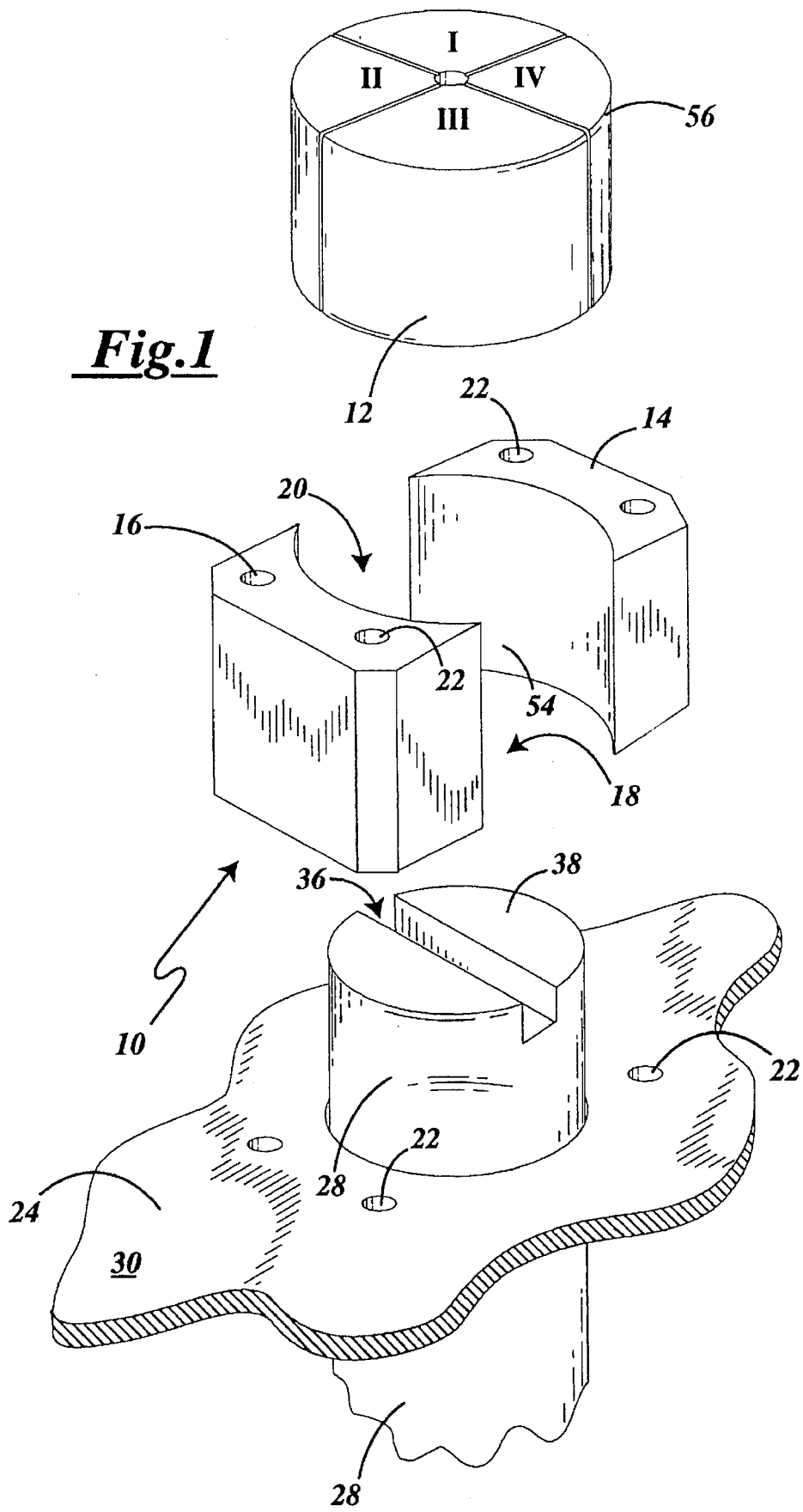
FIG. 1 is an exploded perspective view of the valve position indicator in accordance with the present invention.
Figure 2:
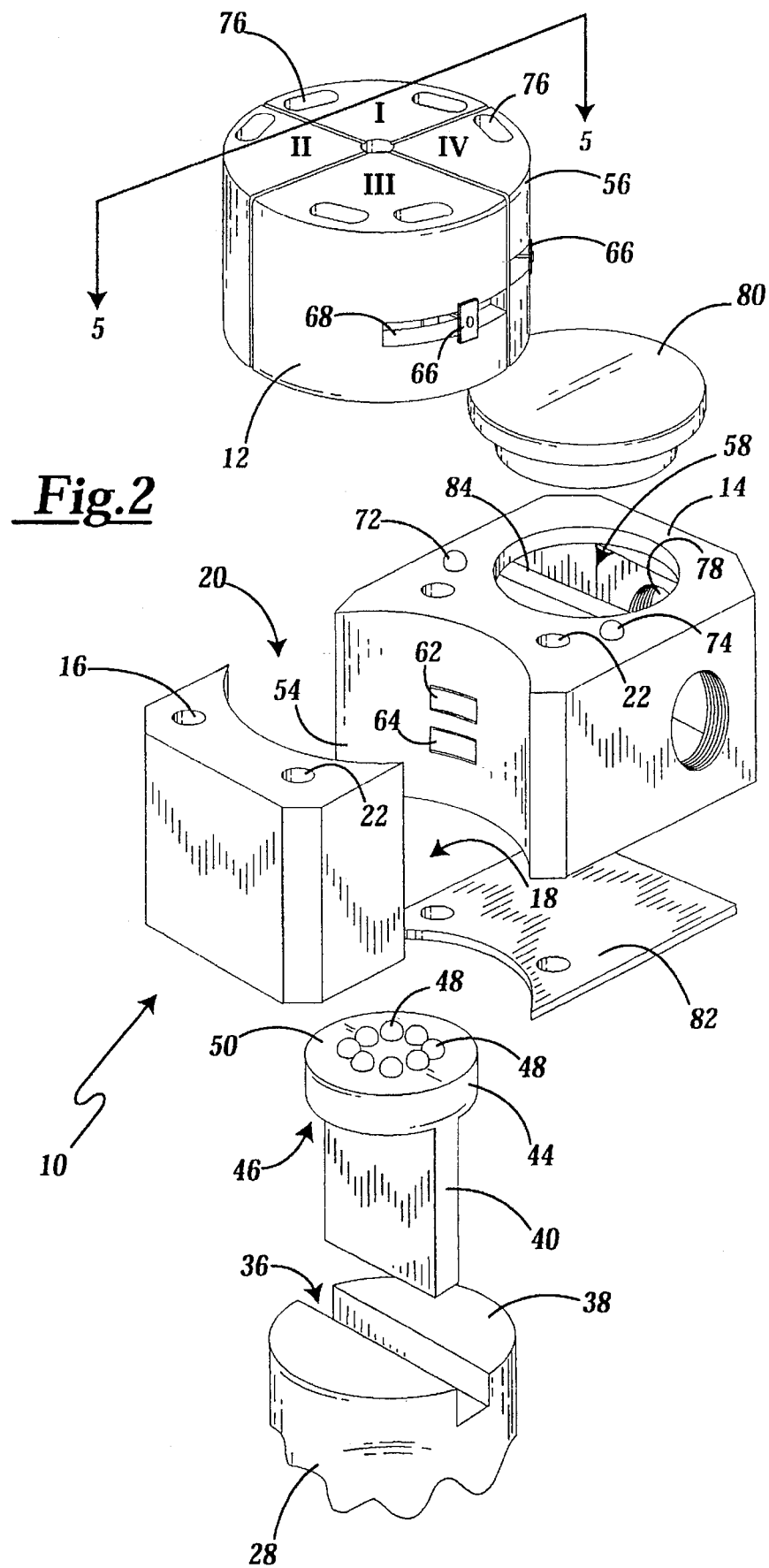
FIG. 2 is a perspective view of an alternate preferred embodiment of the valve position indicator.

Referring first to FIG. 1, the valve position indicator 10 is generally shown. It consists of a drum 12, and first and second housing members 14 and 16, wherein the first and second housing members 14 and 16 can be positioned about the drum 12 to provide first and second window areas 18 and 20 for visual indication. The overall height of the drum 12 and housings members 14 and 16 are within the NAMUR standards (between approximately 2–3 inches, 45–75 mm), and may, alternatively be less than the NAMUR standard to thereby allow a second accessory to be mounted above the drum and housing, such that the resulting overall height remains within the NAMUR standard. Screw holes 22 extending vertically through the housing members are likewise sized and spaced to comply with NAMUR standards.

The valve position indicator 10 is attached to a valve body 24, comprising a rotatable valve (not shown) contained within the valve body 24, and an actuator shaft 28 extending from the valve and projecting outwardly from a planar top surface 30 of the valve body 24. In the preferred embodiment, the valve is a quarter turn valve. The drum 12 is mounted to the actuator shaft 28 and rotates simultaneously with the actuator shaft. The drum 12 and actuator shaft 28 rotate between a first position when the valve 26 is in a fluid blocking condition and a second position when the valve is in a fully open, fluid passing condition.

To adapt to NAMUR standards, the actuator shaft 28 may have a slot 36 formed on the end of the shaft 38. A blade 40 extending from the underside of the top surface 42 of the drum mates with the actuator shaft's slot 36, thereby locking the drum 12 into rotational engagement with the actuator shaft 28. In an alternate preferred embodiment shown in FIGS. 2–5, a cylindrical key member 44, positionable within the drum 12, has the blade 40 extending from its bottom surface 46 and keying bosses 48 extending from a top surface 50. The keying bosses 48 are positioned symmetrically on the key member 44 and mate with corresponding shaped recesses 52 formed in the underside of the top surface 42 of the drum 12. Without limitation, the keying bosses 48 may be formed in the shape of a hexagon, wherein the corresponding recesses 52 are likewise shaped in the form of a hexagon. The keying member 44 allows the user to align and engage the drum 12 in several varying angular orientations relative to the slot 36 of the actuator shaft 28.

Figure 3:
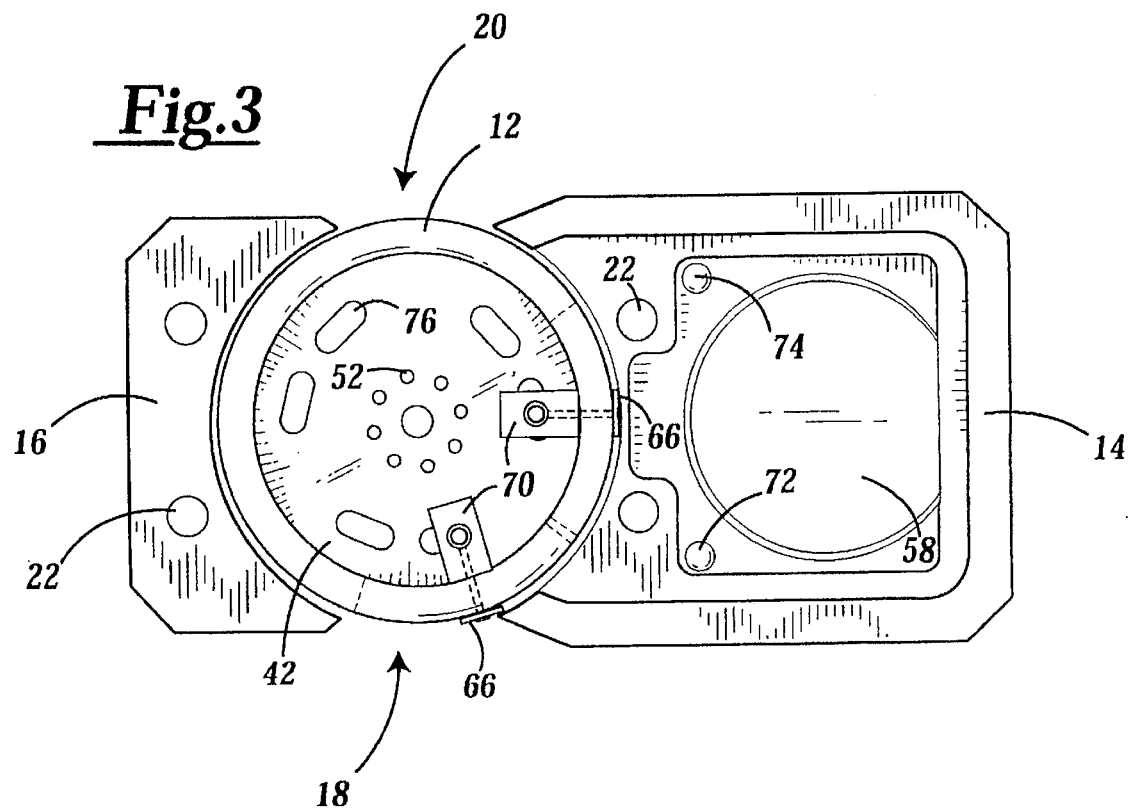
FIG. 3 is a bottom view of a partially assembled valve position indicator of the type shown in FIG. 2.
Figure 4:
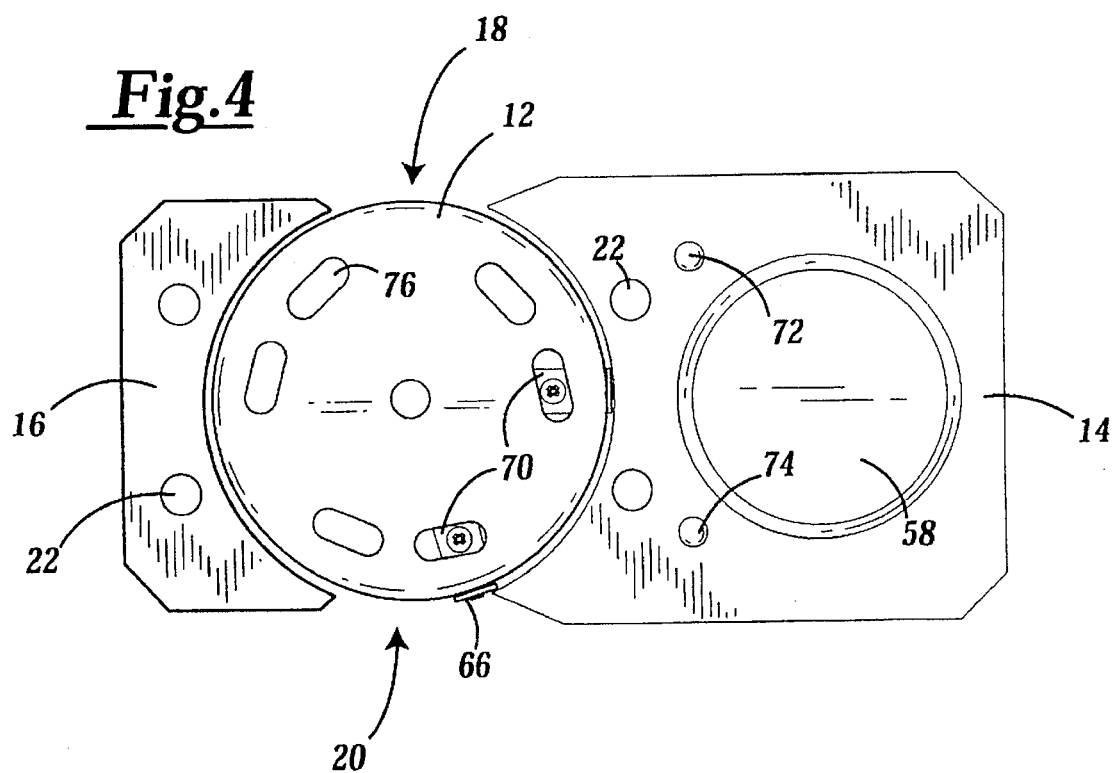
FIG. 4 is a top view of an assembled valve position indicator of the type shown in FIG. 2.
Figure 5:
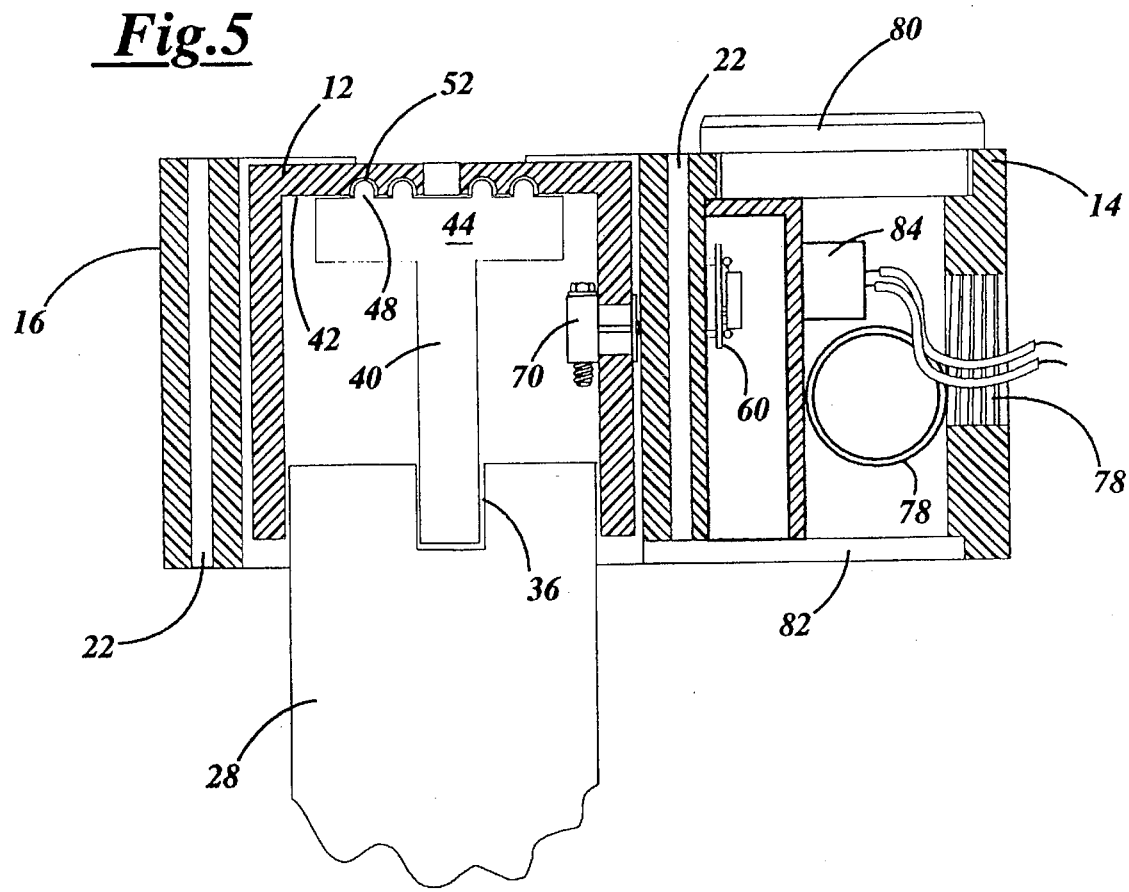
FIG. 5 is a partial sectional view of an assembled valve position indicator of the type shown in FIG. 2.

The first and second housing members 14 and 16 each have a concave, arcuate surface 54 whereby, when they are attached to the planar surface 30 of the valve body 24, the external cylindrical surface of the drum 56 is partially surrounded by the housing members, leaving the first and second window 18 and 20 for viewing the drum 12 (see FIGS. 3 and 4). As is apparent from the earlier description, the drum 12 is rotatably positioned between the housing members and the external cylindrical surface 56 of the drum. Drum 12 is partitioned into four quadrants identified by Roman numerals I–IV. The four quadrants are preferably colored with complementary colors, wherein quadrants I and III have the same color and quadrants II and IV have a complementary color. Without limitation, the first and fourth quadrants may be colored red and the second and fourth quadrants may be colored green. Hence, when the valve is in the first closed position, the red portion of the drum is visible in the windows, and when the valve is in the second open position, the green portion of the drum is visible in the windows. The colored segments assists a viewer in determining whether the valve is in the first position or second position when viewed from a distance.

Referring next to FIGS. 2–5, an alternate preferred valve position indicator 10 is shown. In this alternate preferred embodiment, either the first or the second housing member 14 or 16 has a hollow cavity 58 formed therein, to thereby contain an electronic circuit assembly 60. A top cover 80 and a bottom cover 82 sealably enclose the cavity 58 (see FIGS. 2 and 5). The circuit assembly 60 receives inputs from first and second electrical proximity sensors 62 and 64. The first and second sensors 62 and 64 are positioned on the concave arcuate surface 54 of the housing member 14. Each sensor cooperates with a target member 66 wherein the target member 66 is mounted on the cylindrical exterior surface of the drum 12. The sensors 62 and 64 are electrically linked, via an electrical terminal junction strip 84 of a type known in the art, to the circuit assembly 60 which is used to selectively energize electrically linked first and second LED indicators 72 and 74 which project through the top surface of housing member 14. When the target members 66 actuate the sensors 62 or 64 the corresponding LED indicator 72 or 74 is illuminated.

The target members 66 may be a metallic strip or other known construction, to thereby activate the associated proximity sensor 62 or 64 when the associated target member 66 is aligned with the sensor. The target members 66 are fastened to the drum 12 by fasteners 70 through a slot 68. The fasteners 70 slidingly adjusts along the slot 68 formed within the drum's external cylindrical surface 56. In the preferred embodiment, the alignment of the target members on the drum may be adjusted approximately 15° to accurately indicate the position of the drum in relation to the position of the valve. Apertures 76 extending through the top of the drum 12, allow the internal portion of the fastener 70 to be accessed, without requiring the removal of the drum 12 from the actuator shaft 28 (see FIG. 5) when making the initial adjustment at the time of installation. Of course, those skilled in the art will recognize that a plurality of appropriately spaced bores may replace the slots 68, wherein the target member may be centered and fastened to a selected bore with a self tapping screw.

The target members 66 are positioned on the drums 12 such that when the drum 12 is rotated to a first fluid blocking position the first sensor 62 is actuated, thereby causing a LED 72 of a first color to be illuminated. When the drum 12 is rotated to a second fluid passing condition, the second sensor 64 is actuated, thereby causing LED 74 of a different color to be illuminated. Without limitation, the color of the illuminated LED may correspond to the colors of the quadrant pairs visible through the windows defined by the two housing members.

The electronic circuit assembly 60 may also include a microprocessor-based controller, whereby the drum's position may be monitored by the microprocessor and used to transmit valve position information to a remote site. In this manner, both the colored drum 12 and LED indicators 72 and 74 indicate to the viewer whether the valve is in a fluid blocking or fluid passing condition, while the microprocessor may store time based information related to the changing position of the valve or other data for later transmission. The electrical wiring for providing power to the circuit assembly and for transmitting data may pass through any of a plurality of conduit fittings 78 formed in the housing 14. The electrical wiring connecting the power supply, sensors 62 and 64, LED's 72 and 74, circuit assembly 60, and optional microprocessor, connects to the electrical terminal junction strip 84 contained within the housing 14. The same electrical terminal strip 84 may have additional termination (connection) capabilities for other accessories. Should multiplexing capabilities be added, the terminal points of the electrical terminal strip 84 may be utilized as switching outputs for auxiliary devices.

This invention has been described herein in considerable detail in order to comply with the patent statutes and to provide those skilled in the art with the information needed to apply the novel principles and to construct and use such specialized components as required. However, it is to be understood that the invention can be carried out by specifically different devices, and that various modifications, both as to the equipment details and the operating procedures, can be accomplished without departing from the scope of the invention itself.

What is claimed is:

1. A valve position indicator for attachment to a valve body, the valve body including a shaft projecting outwardly from a planar surface and rotatable between a first position when the valve is in a fluid blocking condition and a second position when the valve is in a fully open, fluid passing condition, the valve position indicator comprising:

(a) a visual indicator drum having an external cylindrical surface partitioned into four quadrants with the first and third quadrants of a first color and the second and fourth quadrants of a second color distinctive from the first color, said drum being secured to said shaft and rotatable therewith, said drum further haveing a plurality of radially spaced apertures formed through the cylindrical surface at predetermined locations;

(b) means for mounting a target member in each of the plurality of radially spaced apertures; and (c) first and second window defining members attached to said planar surface of the valve body at locations diametrically opposite one another relative to the drum, each including a concave arcuate surface cooperating with the external cylindrical surface of the drum, the first and second window defining members partially surrounding the drum to expose to view the first color when the shaft is in its first position and to expose to view the second color when the shaft is in its second position.

2. The valve position indicator as in claim 1 wherein the means for mounting the target members includes means for setting a desired radial position for the target members on the cylindrical surface of the drum.

3. The valve position indicator as in claim 2 wherein one of the first and second window defining members includes means for sensing movement of the target members with respect to the one of the first and second window defining members as the drum moves between the first position and the second position.

4. The valve position indicator as in claim 3 and further including first and second LED indicators mounted on said one of the first and second window defining members and operatively coupled to the means for sensing movement, thereby illuminating the first and second LED indicators in relation to the rotation of the drum.

5. The valve position indicator as in claim 4 wherein the first and second LED indicators emit colors corresponding to the first and second colors of the quadrants of the drum.

6. The valve position indicator as in claim 3, wherein the means for sensing movement of the target members is electrically connected to an electrical terminal junction strip.

7. The valve position indicator as in claim 3, wherein one of the first and second window defining members has at least one conduit entry opening.

8. The valve position indicator as in claim 6, wherein the electrical terminal junction strip includes termination points for connection of the means for sensing movement and termination points for connection of auxiliary equipment.

* * * * *